US011768597B2

(12) United States Patent
Kim

(10) Patent No.: US 11,768,597 B2
(45) Date of Patent: Sep. 26, 2023

(54) METHOD AND SYSTEM FOR EDITING VIDEO ON BASIS OF CONTEXT OBTAINED USING ARTIFICIAL INTELLIGENCE

(71) Applicant: NAVER CORPORATION, Seongnam-si (KR)

(72) Inventor: Seungjin Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 17/402,153

(22) Filed: Aug. 13, 2021

(65) Prior Publication Data

US 2021/0390317 A1 Dec. 16, 2021

Related U.S. Application Data

(63) Continuation of application No. PCT/KR2020/001705, filed on Feb. 6, 2020.

(30) Foreign Application Priority Data

Feb. 14, 2019 (KR) .......................... 10-2019-0017409

(51) Int. Cl.
*G06F 3/0488* (2022.01)
*G06F 3/0482* (2013.01)
(Continued)

(52) U.S. Cl.
CPC .......... *G06F 3/0488* (2013.01); *G06F 3/0482* (2013.01); *G06F 3/04845* (2013.01);
(Continued)

(58) Field of Classification Search
CPC ........ G06V 20/47; G06V 20/41; G06V 20/46; G06K 9/6217; G06F 3/0482;
(Continued)

(56) References Cited

U.S. PATENT DOCUMENTS 9,570,107 B2 * 2/2017 Boiman ................... H04N 9/87
9,721,165 B1 * 8/2017 Bentley ................. G06V 20/48
(Continued)

FOREIGN PATENT DOCUMENTS

JP H11112870 A * 4/1999
KR 1020040006962 1/2004
(Continued)

OTHER PUBLICATIONS

A. Karpathy, G. Toderici, S. Shetty, T. Leung, R. Sukthankar and L. Fei-Fei, "Large-Scale Video Classification with Convolutional Neural Networks," 2014 IEEE Conference on Computer Vision and Pattern Recognition, 2014, pp. 1725-1732, doi: 10.1109/CVPR. 2014.223 (Year: 2014).*

(Continued)

*Primary Examiner* — Andrew L Tank
(74) *Attorney, Agent, or Firm* — GREER BURNS & CRAIN, LTD.

(57) ABSTRACT

A method and system for editing a video on the basis of a context obtained using artificial intelligence. According to an embodiment of the present invention, the method for editing a video may comprise the steps of: establishing a plurality of contexts for an input video by analyzing the video through an artificial intelligence model, and taking, from the video, a plurality of clips corresponding to the established plurality of contexts; generating a user interface through which to receive a certain context selected from the plurality of contexts; providing, through the generated user interface, a plurality of clips that has been taken from the video for the context selected from the plurality of contexts through the generated user interface; and generating a highlight image for the selected context for the video by merging clips together that have been selected from the plurality of clips provided through the user interface.

9 Claims, 10 Drawing Sheets

(51) Int. Cl.
*G06F 3/04845* (2022.01)
*H04N 21/4402* (2011.01)
*H04N 21/466* (2011.01)
*G06V 20/40* (2022.01)
*G06F 18/21* (2023.01)
*G06V 10/82* (2022.01)
*G06N 5/04* (2023.01)

(52) U.S. Cl.
CPC .............. *G06F 18/21* (2023.01); *G06V 10/82* (2022.01); *G06V 20/41* (2022.01); *G06V 20/47* (2022.01); *H04N 21/4402* (2013.01); *H04N 21/4662* (2013.01); *G06F 2203/04808* (2013.01); *G06N 5/04* (2013.01)

(58) Field of Classification Search
CPC .. G06F 3/04845; G06F 3/0488; G06F 16/739; G06F 2203/04808; G06N 5/04; H04N 21/4402; H04N 21/4662; G11B 27/036
See application file for complete search history.

(56) References Cited

U.S. PATENT DOCUMENTS

| | | | | |
|---|---|---|---|---|
| 10,001,904 | B1* | 6/2018 | Geller | G06F 3/0485 |
| 10,810,435 | B2* | 10/2020 | Lee | G06K 9/6271 |
| 10,943,125 | B1* | 3/2021 | Evans | H04N 21/472 |
| 2007/0174774 | A1* | 7/2007 | Lerman | G06F 16/40 |
| | | | | 715/723 |
| 2012/0144293 | A1* | 6/2012 | Kim | G06F 3/04886 |
| | | | | 715/255 |
| 2012/0148216 | A1* | 6/2012 | Pavagada | H04N 5/772 |
| | | | | 386/278 |
| 2012/0210231 | A1* | 8/2012 | Ubillos | G11B 27/034 |
| | | | | 715/723 |
| 2012/0284622 | A1 | 11/2012 | Avery et al. | |
| 2013/0091431 | A1* | 4/2013 | Master | H04N 21/44008 |
| | | | | 386/E9.011 |
| 2015/0106712 | A1* | 4/2015 | Oh | G06F 3/0482 |
| | | | | 715/716 |
| 2015/0301708 | A1* | 10/2015 | Kostello | G11B 27/34 |
| | | | | 715/723 |
| 2016/0014482 | A1* | 1/2016 | Chen | H04N 21/8456 |
| | | | | 386/241 |
| 2017/0339465 | A1* | 11/2017 | Cannistraro | H04N 21/4126 |
| 2018/0174618 | A1* | 6/2018 | Wikholm | G11B 27/102 |
| 2019/0026015 | A1* | 1/2019 | Lee | G11B 27/34 |
| 2019/0141283 | A1* | 5/2019 | Haas | H04N 21/47205 |
| 2019/0258671 | A1* | 8/2019 | Bou | G06F 40/30 |
| 2019/0355391 | A1* | 11/2019 | Zavesky | G06V 20/48 |

FOREIGN PATENT DOCUMENTS

| | | |
|---|---|---|
| KR | 1020090018360 | 2/2009 |
| KR | 1020100046413 | 2/2010 |
| KR | 1020170066415 | 6/2017 |
| KR | 1020180136265 | 12/2018 |

OTHER PUBLICATIONS

W. Yang and G. Toderici, "Discriminative tag learning on YouTube videos with latent sub-tags," CVPR 2011, 2011, pp. 3217-3224, doi: 10.1109/CVPR.2011.5995402. (Year: 2011).*

Y. J. Lee, J. Ghosh and K. Grauman, "Discovering important people and objects for egocentric video summarization," 2012 IEEE Conference on Computer Vision and Pattern Recognition, 2012, pp. 1346-1353, doi: 10.1109/CVPR.2012.6247820. (Year: 2012).*

A. Girgensohn, J. Boreczky and L. Wilcox, "Keyframe-based user interfaces for digital video," in Computer, vol. 34, No. 9, pp. 61-67, Sep. 2001, doi: 10.1109/2.947093. (Year: 2001).*

International Search Report and Written Opinion for corresponding PCT Application No. PCT/KR2020/001705, dated May 14, 2020.

* cited by examiner

METHOD AND SYSTEM FOR EDITING VIDEO ON BASIS OF CONTEXT OBTAINED USING ARTIFICIAL INTELLIGENCE

CROSS-REFERENCE TO RELATED APPLICATIONS

This is a continuation application of International Application No. PCT/KR2020/001705, filed Feb. 6, 2020, which claims the benefit of Korean Patent Application No. 10-2019-0017409, filed Feb. 14, 2019.

BACKGROUND OF THE INVENTION

Field of the Invention

The following description relates to a video editing method and system based on context acquired using artificial intelligence (AI).

Description of Related Art

A video may be represented through a consecutive screen output of images (frames) over time. Editing of such a video may be performed through editing of the individual frames. For example, Korean Patent Laid-Open Publication No. 10-2004-0006962 (hereinafter, "Patent Document 1") relates to a video editing method and apparatus and describes technology for editing a video using a cache that stores frame data in the form of a linked list. In detail, Patent Document 1 describes a configuration for generating a frame index for a video file, reading/decoding data of a frame included in a frame index range for a frame selected by a user in a video editing mode and storing the data in the cache, and displaying and editing the selected frame data.

However, in many cases, the number of frames included in a single video file is too large for editors to individually examine the frames one by one, and it is very inconvenient for the editors to retrieve and edit desired frames while looking at a large number of frames one by one.

BRIEF SUMMARY OF THE INVENTION

One or more example embodiments provide a video editing method and system that may provide a guide for video editing to a user based on a context identified in a video.

One or more example embodiments provide a video editing method and system that enables video editing based on a user-specified context.

According to an aspect of at least one example embodiment, there is provided a video editing method of a computer apparatus including at least one processor, the video editing method including analyzing an input video through an artificial intelligence (AI) model, setting a plurality of contexts for the video, and extracting, from the video, a plurality of clips corresponding to the set plurality of contexts, respectively; generating a user interface for selecting a specific context from among the plurality of contexts; providing a plurality of clips extracted from the video for a context selected from among the plurality of contexts through the generated user interface, through the user interface; and generating a highlight image of the selected context for the video by merging clips selected from among the plurality of clips provided through the user interface.

According to an aspect of at least one example embodiment, there is provided a computer program stored in a computer-readable record medium to perform the method in conjunction with a computer apparatus.

According to an aspect of at least one example embodiment, there is provided a computer-readable record medium storing a computer program to perform the method in a computer apparatus.

According to an aspect of at least one example embodiment, there is provided a computer apparatus including at least one processor configured to execute a computer-readable instruction. The at least one processor is configured to analyze an input video through an AI model, set a plurality of contexts for the video, and extract, from the video, a plurality of clips corresponding to the set plurality of contexts, respectively, generate a user interface for selecting a specific context from among the plurality of contexts, provide a plurality of clips extracted from the video for a context selected from among the plurality of contexts through the generated user interface, through the user interface, and generate a highlight image of the selected context for the video by merging clips selected from among the plurality of clips provided through the user interface.

According to some example embodiments, it is possible to provide a guide for video editing to a user based on a context identified in a video and to enable video editing based on a user-specified context.

DETAILED DESCRIPTION OF THE INVENTION

Hereinafter, example embodiments are described with reference to the accompanying drawings.

A video editing system according to the example embodiments may be implemented by the following computer apparatus. A computer program according to an example embodiment may be installed and executed on the computer apparatus, and the computer apparatus may perform a video editing method according to an example embodiment under control of the executed computer program. The aforementioned computer program may be stored in a non-transitory computer-readable record medium to computer-implement the video editing method in conjunction with the computer apparatus. Here, the aforementioned computer program may be in the form of a single independent program package, and may be in a form in which a single independent program package is pre-installed in the computer apparatus and linked with an operating system or other program packages.

Figure 1:
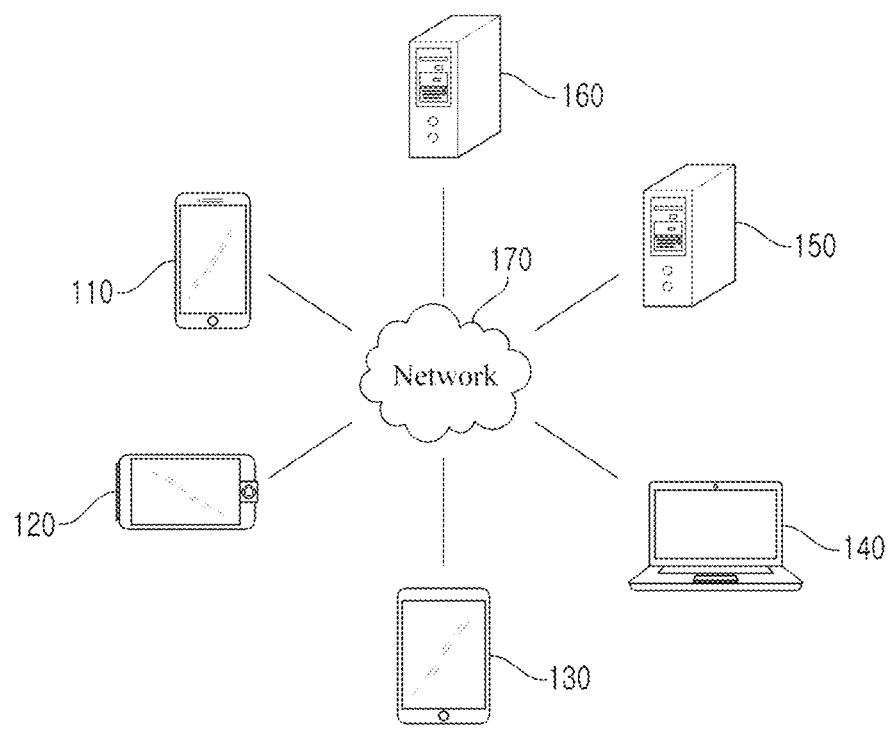
FIG. 1 illustrates an example of a network environment according to an example embodiment.

FIG. 1 illustrates an example of a network environment according to an example embodiment. Referring to FIG. 1, the network environment may include a plurality of electronic devices 110, 120, 130, and 140, a plurality of servers 150 and 160, and a network 170. FIG. 1 is provided as an example only. The number of electronic devices and the number of servers is not limited to the quantities of these components shown in this example. Also, the network environment of FIG. 1 is provided as an example of one of the environments applicable to the example embodiments, and the environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of the various types of physical computer apparatuses capable of communicating with other electronic devices 120, 130, and 140, and/or the servers 150 and 160 over the network 170 in a wireless or wired communication manner.

The communication scheme is not limited, and may include a near field wireless communication scheme between devices, as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service (e.g., a content providing service, a social network service, a video call service, a financial service, a payment service, a messaging service, a search service, a mail service, and/or a question-and-answer service) to the plurality of electronic devices 110, 120, 130, and 140 connected over the network 170.

Figure 2:
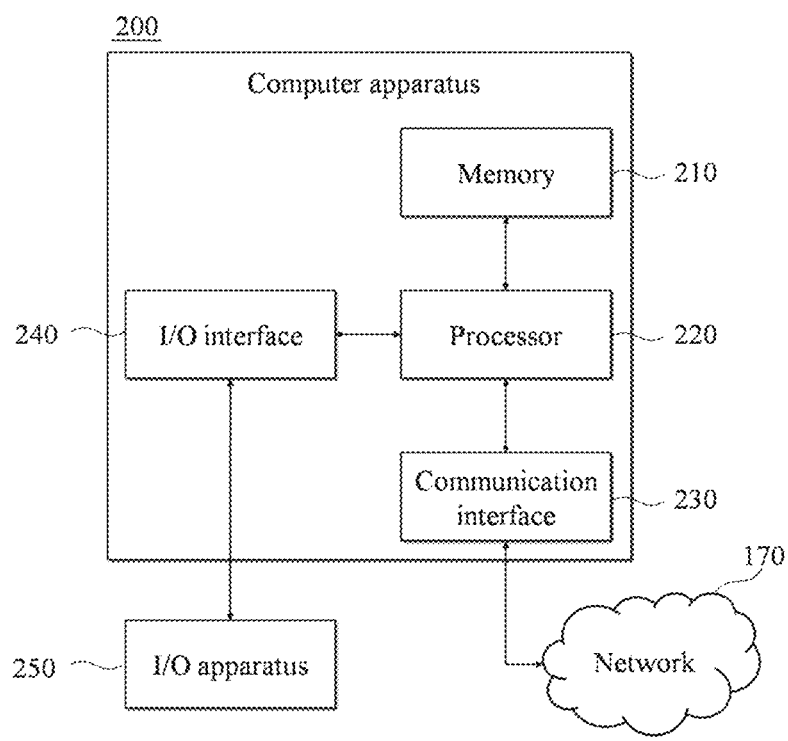
FIG. 2 is a block diagram illustrating an example of a computer apparatus according to an example embodiment.

FIG. 2 is a block diagram illustrating an example of a computer apparatus according to an example embodiment. Each of the plurality of electronic devices 110, 120, 130, and 140 or each of the servers 150 and 160 may be implemented in a computer apparatus 200 of FIG. 2. A method according to example embodiments may be performed by the computer apparatus 200.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and disk drive, may also be included in the computer apparatus 200 as a permanent storage device that is separate from the memory 210. Also, an OS (Operating System) and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 based on a computer program installed by files provided over the network 170.

The processor 220 may be configured to process instructions of a computer program by performing basic arithmetic operations, logic operations, and I/O operations. The instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and other apparatuses, for example, the aforementioned storage devices, over the network 170. For example, the processor 220 of the computer apparatus 200 may transfer a request or instruction created based on a program code stored in the storage device such as the memory 210, data, a file, etc., to the other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used for interface with an I/O apparatus 250. For example, an input device may include a device, such as a microphone, a keyboard, a camera, a mouse, etc., and an output device may include a device, such as a display, a speaker, etc. As another example, the I/O interface 240 may be a device for interface with an apparatus in which an input function and an output function are integrated into a single function, such as a touchscreen. The I/O apparatus 250 may be configured as a single apparatus with the computer apparatus 200.

Also, according to other example embodiments, the computer apparatus 200 may include more components or fewer components than those shown in FIG. 2. However, there is no need to clearly illustrate many components according to the related art, as such components would be known to those of ordinary skill in the art. For example, the computer apparatus 200 may be configured to include at least a portion of the I/O apparatus 250 or may further include other components, for example, a transceiver and a database.

Figure 3:
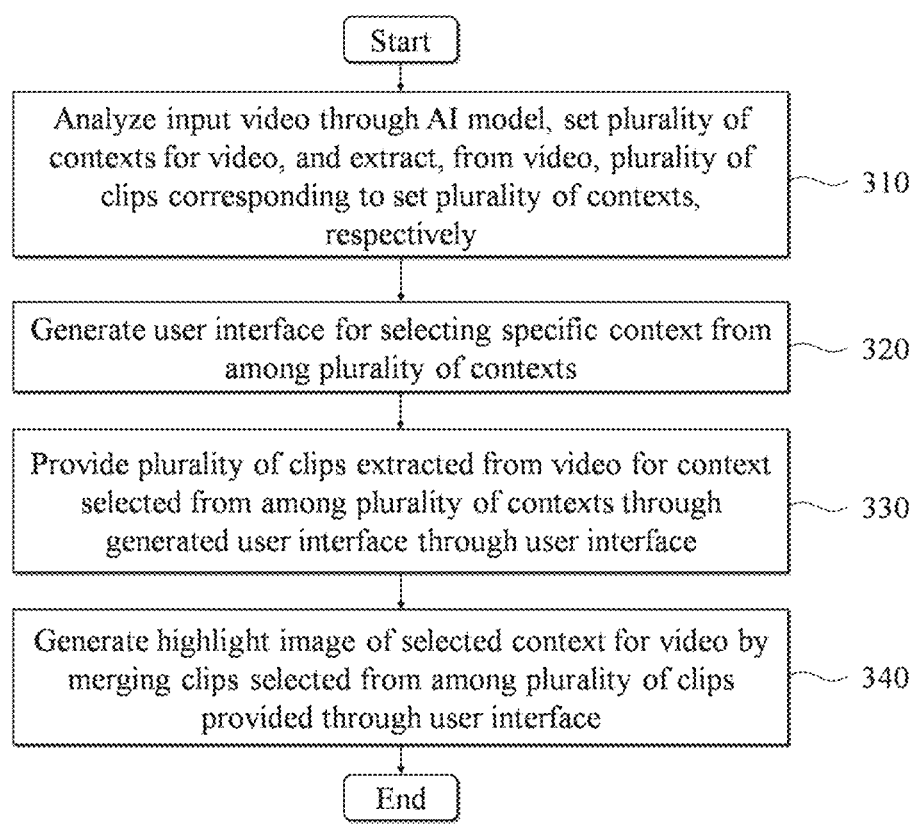
FIG. 3 is a flowchart illustrating an example of a video editing method according to an example embodiment.

FIG. 3 is a flowchart illustrating an example of a video editing method according to an example embodiment. The video editing method according to the example embodiment may be performed by the aforementioned computer apparatus 200. For example, the computer apparatus 200 may correspond to one of the plurality of electronic devices 110, 120, 130, and 140 or one of the plurality of servers 150 and 160, which are described above with reference to FIG. 1. In detail, for example, when the computer apparatus 200 is the electronic device 110, the computer apparatus 200 may provide an editing function for a video selected or downloaded by the electronic device 110. As another example, when the computer apparatus 200 is the server 150, the computer apparatus 200 may provide an editing function for a video received from a client, for example, the electronic device 120, to the client. Meanwhile, the processor 220 of the computer apparatus 200 may be configured to execute a control instruction according to a code of at least one program or a code of an operating system (OS) included in the memory 220. Here, the processor 220 may control the computer apparatus 200 to perform operations 310 to 340 included in the method of FIG. 3 in response to the control instruction provided from the code stored in the computer apparatus 200.

In operation 310, the computer apparatus 200 may analyze an input video through an artificial intelligence (AI) model, may set a plurality of contexts for the video, and may extract, from the video, a plurality of clips corresponding to the plurality of contexts, respectively, that have been set for the video. Here, the AI model may be trained to analyze the input video, to extract a context related to the video from among a plurality of preset contexts, and to extract consecutive frames corresponding to the extracted context as a single clip. In detail, for example, the AI model may be equipped with convolutional neural network (CNN) technology, and may classify each of the frames of the video into a specific subject. Here, a subject may be preset using various subjects, such as a person, a season, a fashion, a background, an animal, and a text. When it is assumed that the AI model classifies each of the frames included in a video for each person that appears in a corresponding frame, the computer apparatus 200 may extract a set of consecutive frames in which, for example, person A appears in the video as a single clip through the AI model. In this case, if the number of sets of consecutive frames in which person A appears is plural, a plurality of clips may be extracted. Also, if person A, person B, and person C appear in the video, at least one clip for person A, at least one clip for person B, and at least one clip for person C may be extracted. Here, it will be easily understood that a number of clips may be determined based on the number of times each person appears in a video. Here, each of "person A," "person B," and "person C" may be a context of the video. That is, on the subject "person," person A, person B, and person C that appear in the video 1 may be the respective individual contexts. If the subject is a season and all of scenes of spring, summer, autumn, and winter are included in video 2, "spring," "summer," "autumn," and "winter" may be the respective individual contexts.

Depending on example embodiments, each of the contexts may have a hierarchical structure that includes a single main context and a plurality of sub-contexts for the single main context. Here, the computer apparatus 200 may classify, into the plurality of sub-contexts, a plurality of clips extracted for the single main context in operation 310. For example, a clip in which food also appears among clips in which "person A" appears as a main context may be classified into a sub-context "food."

Meanwhile, when the computer apparatus 200 corresponds to the electronic device 110, a module for the AI model trained for a video editing application to be installed and executed on the electronic device 110 may be included. As another example, when the computer apparatus 200 corresponds to the server 150, the server 150 may directly train the AI model. Depending on example embodiments, the server 150 may be equipped with the pretrained AI model and may provide a video editing service. In this case, the client may receive the video editing service through communication with the server 150 over the network 170 using the video editing application.

In operation 320, the computer apparatus 200 may generate a user interface for selecting a specific context from among the plurality of contexts. The generated user interface may be provided through, for example, a webpage in a web environment or may be provided through a video editing application in a mobile environment. A user may select a specific context from the plurality of contexts provided through the provided user interface. In the aforementioned example of the video, the user may be provided with a user interface through which "person A," "person B," and "person C" are displayed as contexts. Here, the user may select a desired context by selecting a single representative image from among representative images of "person A," "person B," and "person C" displayed through the user interface.

If a main context and sub-contexts are present, the user interface may be generated to receive a selection on the main context and at least one of the sub-contexts. To this end, in operation 320, the computer apparatus 200 may generate the user interface that includes a function for selecting a main context for a single context from among the plurality of contexts and a function for selecting a single sub-context from among a plurality of sub-contexts for the selected main context. For example, the user interface may display "person A," "person B," and "person C" as main contexts for the video and may suggest sub-contexts, such as "single," "multiple," "baby," "spring," "summer," "autumn," "winter," "smile," "nature," "food," "animal," "fashion," "snow scene," "nightscape," "sunset," and "text" as sub-contexts. The main context and the sub-contexts may be preset according to the purpose of a service or may be set in response to a selection from the user from among a plurality of contexts suggested through a function provided by the user interface.

In operation 330, the computer apparatus 200 may provide a plurality of clips extracted from the video for a context selected from among the plurality of contexts through the generated user interface, through the user interface. For example, in the aforementioned example of the video, when the user selects "person A" as the main context and "food" as the sub-context, clips in which "person A" and "food" appear together may be provided to the user through the user interface. Depending on example embodiments, a plurality of sub-contexts may be selected. In this case, clips that satisfy all of the plurality of sub-contexts may be provided to the user through the user interface.

In operation 340, the computer apparatus 200 may generate a highlight image of the selected context for the video by merging clips selected from among the plurality of clips provided through the user interface. Here, a clip may be provided through the user interface by displaying a snapshot of a first frame among the frames included in the clip or a preset representative frame. For example, if the user selects two clips from among ten clips in a state in which ten snapshots for the ten clips are displayed through the user interface, the computer apparatus 200 may generate a highlight image of a selected context by merging frames corresponding to the selected two clips in temporal order in the video. Accordingly, the user may edit the corresponding video based on a unit of a clip for each context by simply selecting a desired context.

Depending on example embodiments, the computer apparatus 200 may provide an editing function of a frame unit for a clip selected from among the plurality of clips provided through the user interface. That is, in frame-by-frame editing, the user may acquire a desired highlight image by examining the frames of a clip provided for a desired context, and thus may perform frame-by-frame editing without examining all of the frames of the entire video one by one.

Also, the computer apparatus 200 may also provide a section editing function for a clip selected from among the plurality of clips provided through the user interface. Here, the section editing function may include a function for recognizing a multi-touch contact including a first touch and a second touch on a touchscreen in a touchscreen environment, making the distance between a position of the first touch on the touchscreen and a position of the second touch on the touchscreen correspond to a playback section of the selected clip, changing a playback start point of the selected clip in response to a change in the position of the first touch on the touchscreen, and changing a playback end point of the selected clip in response to a change in the position of the second touch on the touchscreen.

For instance, in this example, assume that a clip including a playback section of which a playback start point is "00:00:10:00" and a playback end point is "00:00:19:00" based on an input video is selected. A multi-touch contact according to a first touch triggered by a right thumb of the user and a second touch triggered by a right index finger of the user on a touchscreen may be considered. Here, the distance between the initial positions of the multi-touch (a first position of the first touch and a second position of the second touch) may correspond to the playback section of the selected clip. Here, when a distance between the first position and the second position is assumed as 10 cm, 1 mm may correspond to 1 second of the playback section. In this case, if the user moves the thumb of the right hand such that the first position of the first touch is 3 mm further away from the second position of the second touch, a start point of the selected clip may be changed to a part 3 seconds earlier than the existing start point in the video. For example, the playback start point of the clip may be changed from "00:00:10:00" to "00:00:07:00." If the user moves the index finger of the right hand such that the second position is 5 mm away from the first position, the playback end point of the clip may be changed from "00:00:19:00" to "00:00:24:00." Conversely, if the first position is changed to be closer to the second position, the playback start point may be changed to a later part of the video compared to the existing playback start point. If the second position is changed to be closer to the first position, the playback end point may be changed to an earlier part compared to the existing playback end point.

Figure 4:
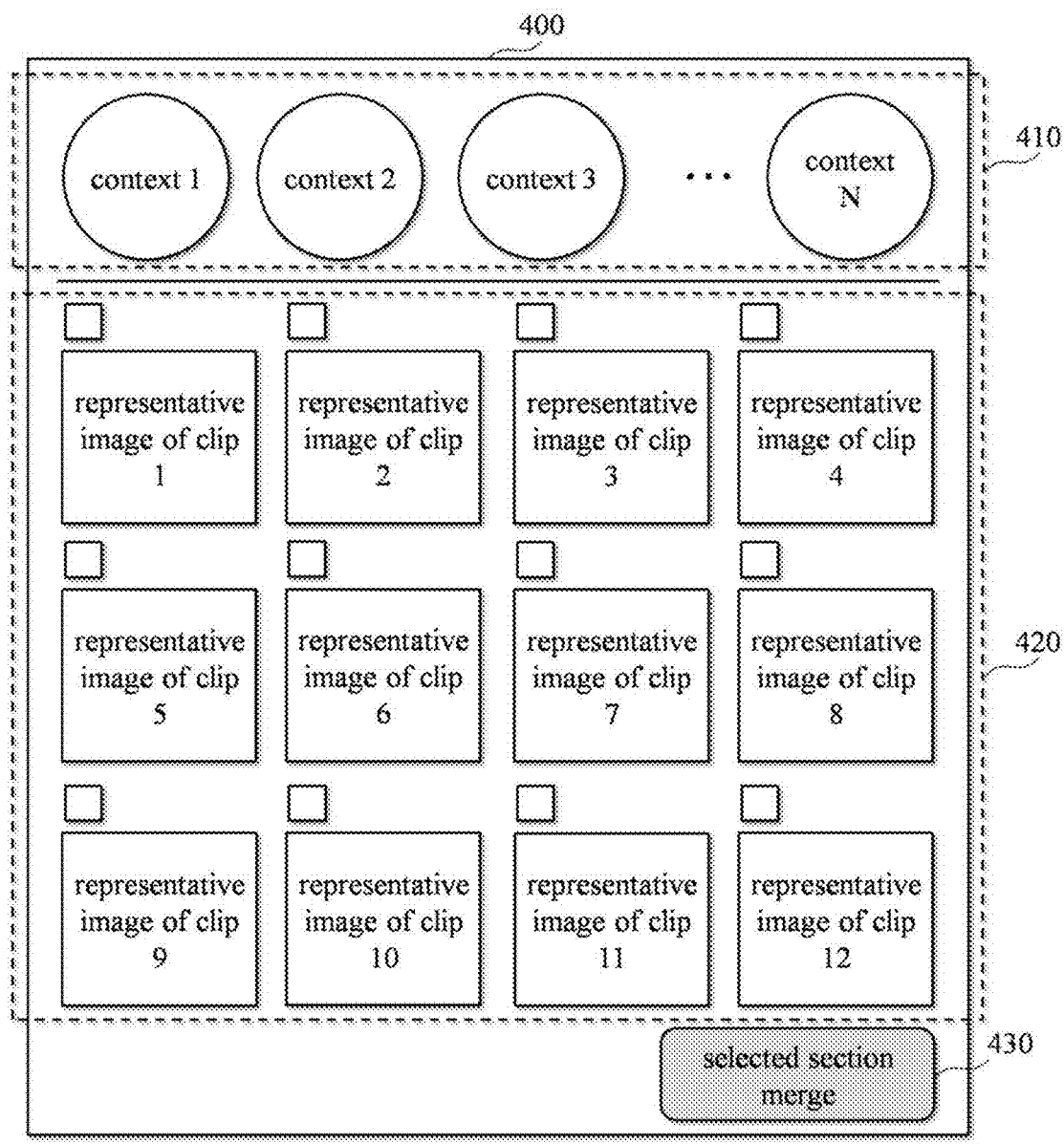
FIGS. 4 to 6 illustrate examples of a video editing screen according to an example embodiment.
Figure 5:
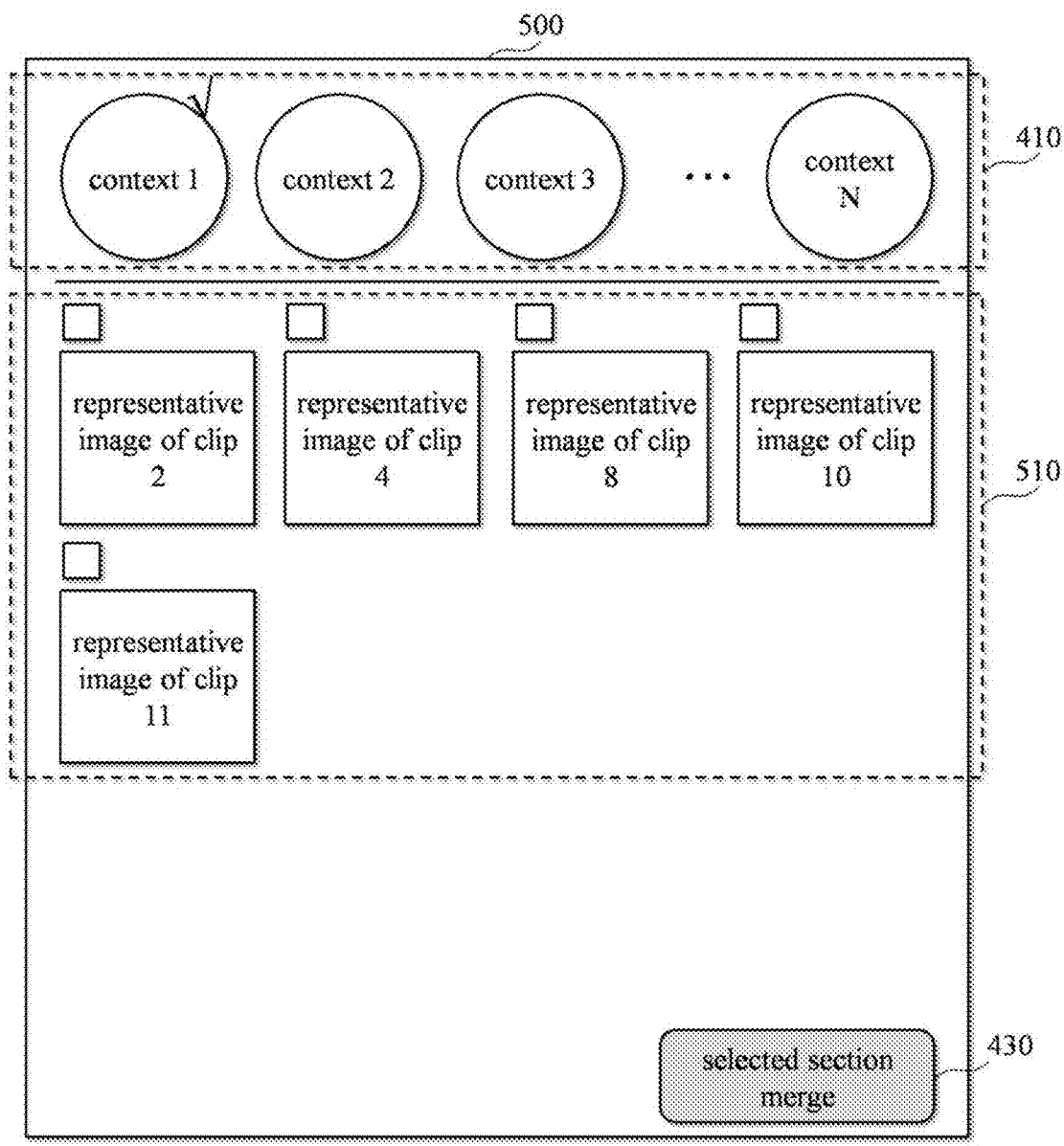
Figure 6:
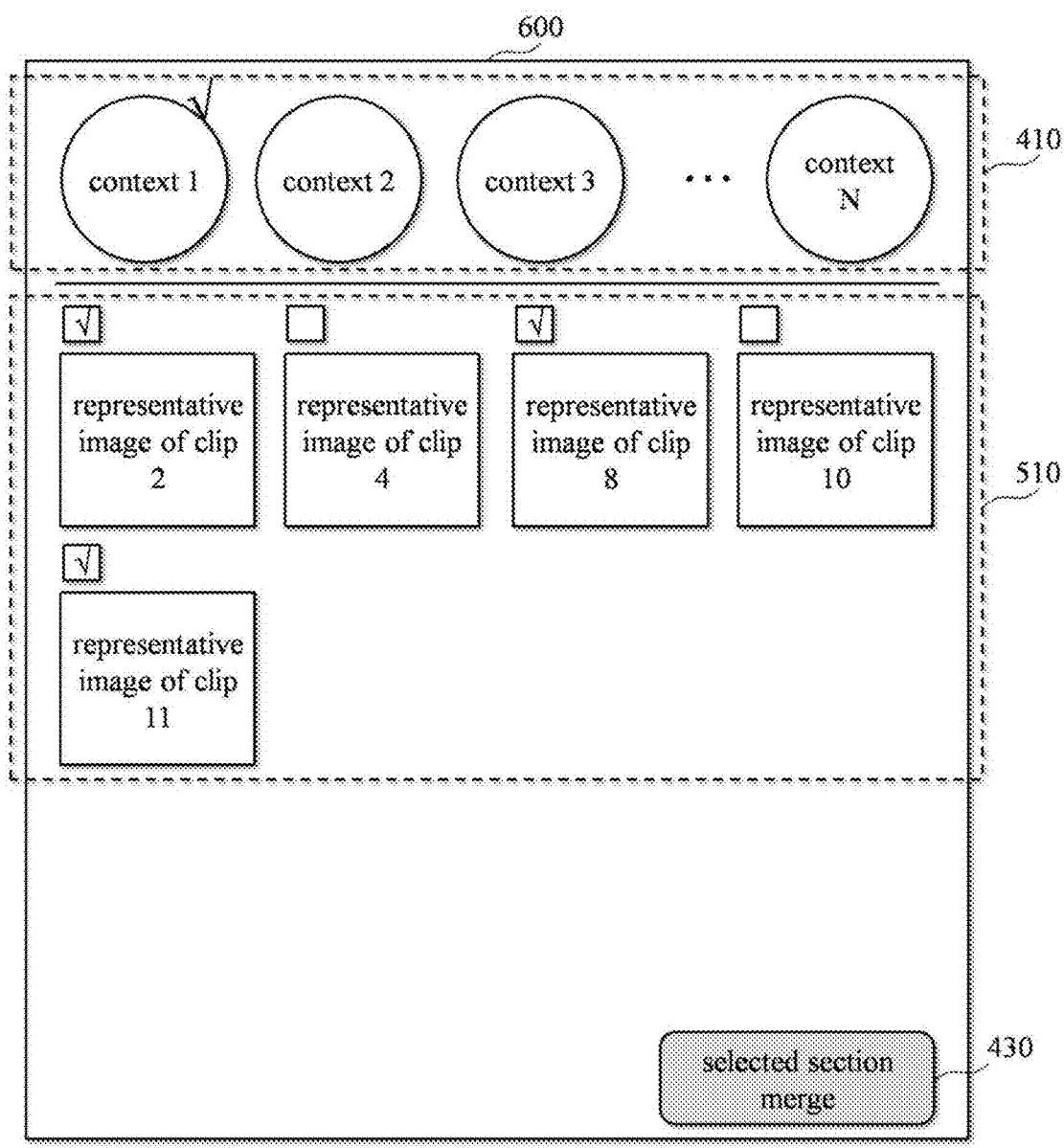

FIGS. 4 to 6 illustrate examples of a video editing screen according to an example embodiment.

Here, FIG. 4 illustrates an example of a first screen 400 on which the user interface of FIG. 3 is displayed. On the first screen 400, a first box 410 indicated with dotted lines represents an example of a plurality of contexts that have been set through an AI model. Here, the contexts may be displayed using various methods that allow the user to identify a context, such as, for example, an icon, text, and an image. For example, to display a person that appears in a video, a representative image of the corresponding person may be displayed on the first screen 400 as a context. Also, a second box 420 indicated with dotted lines represents an example of a plurality of clips extracted through the AI model. As described above, clips may be displayed such that a snapshot of a single frame among the plurality of frames included in the clips is displayed as a representative image. Here, it will be easily understood that the number of contexts displayed and the number of clips displayed may vary based on the video and a learning method of the AI model. Also, a merge button 430 for merging a selected section is displayed on the first screen 400. If the user selects the merge button 430 after selecting a portion of the clips displayed in the second box 420 indicated with dotted lines (e.g., if the user clicks an area on which the merge button 430 is displayed in a PC environment or if the user touches the area on which the merge button 430 is displayed with a finger in a touchscreen environment), the selected clips may be merged and a highlight image may be generated.

FIG. 5 illustrates an example of a second screen 500 of a user interface that is changed in response to the user selecting a specific context (e.g., "context 1") on the first screen 400. Here, as illustrated in a third box 510 indicated with dotted lines, in response to a selection from the user upon selecting "context 1," clips corresponding to "context 1" from among the entire set of clips are displayed through the user interface. For instance, in this example, clips 2, 4, 8, 10 and 11 are associated with "context 1," and thus those clips are the only ones shown in the third box 510 after the user has selected context 1 from within the first box 410.

FIG. 6 illustrates an example of a third screen 600 on which the user selects a specific clip, or a plurality of clips (e.g., "clip 2," "clip 8," and "clip 11") on the second screen 500. Here, on the third screen 600, the clips selected through check marks of check boxes corresponding to the selected clips are displayed. If the user selects the merge button 430, a highlight image in which the frames of "clip 2," "clip 8," and "clip 11" are merged may be generated.

Figure 7:
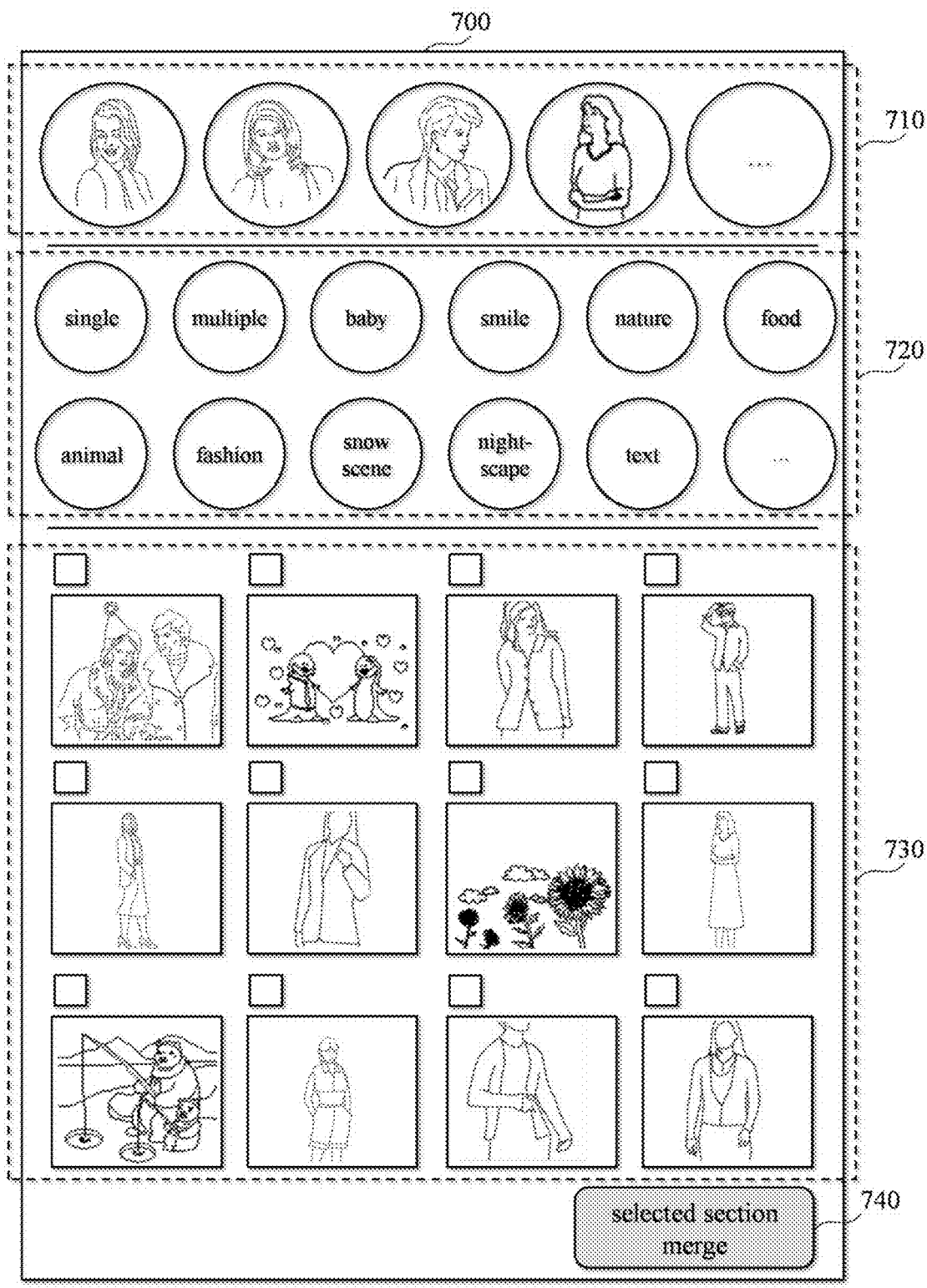
FIGS. 7 to 9 illustrate other examples of a video editing screen according to an example embodiment.
Figure 8:
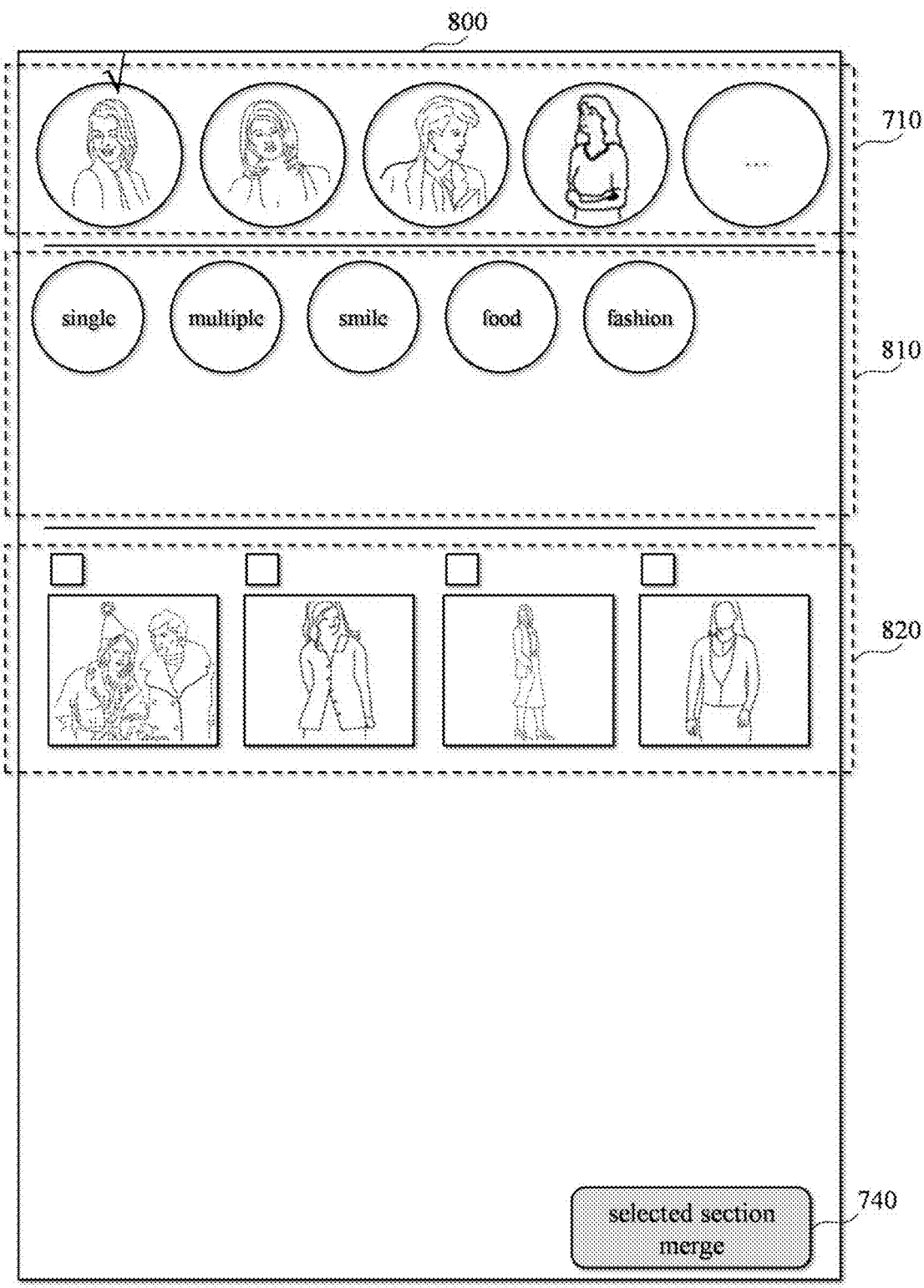
Figure 9:
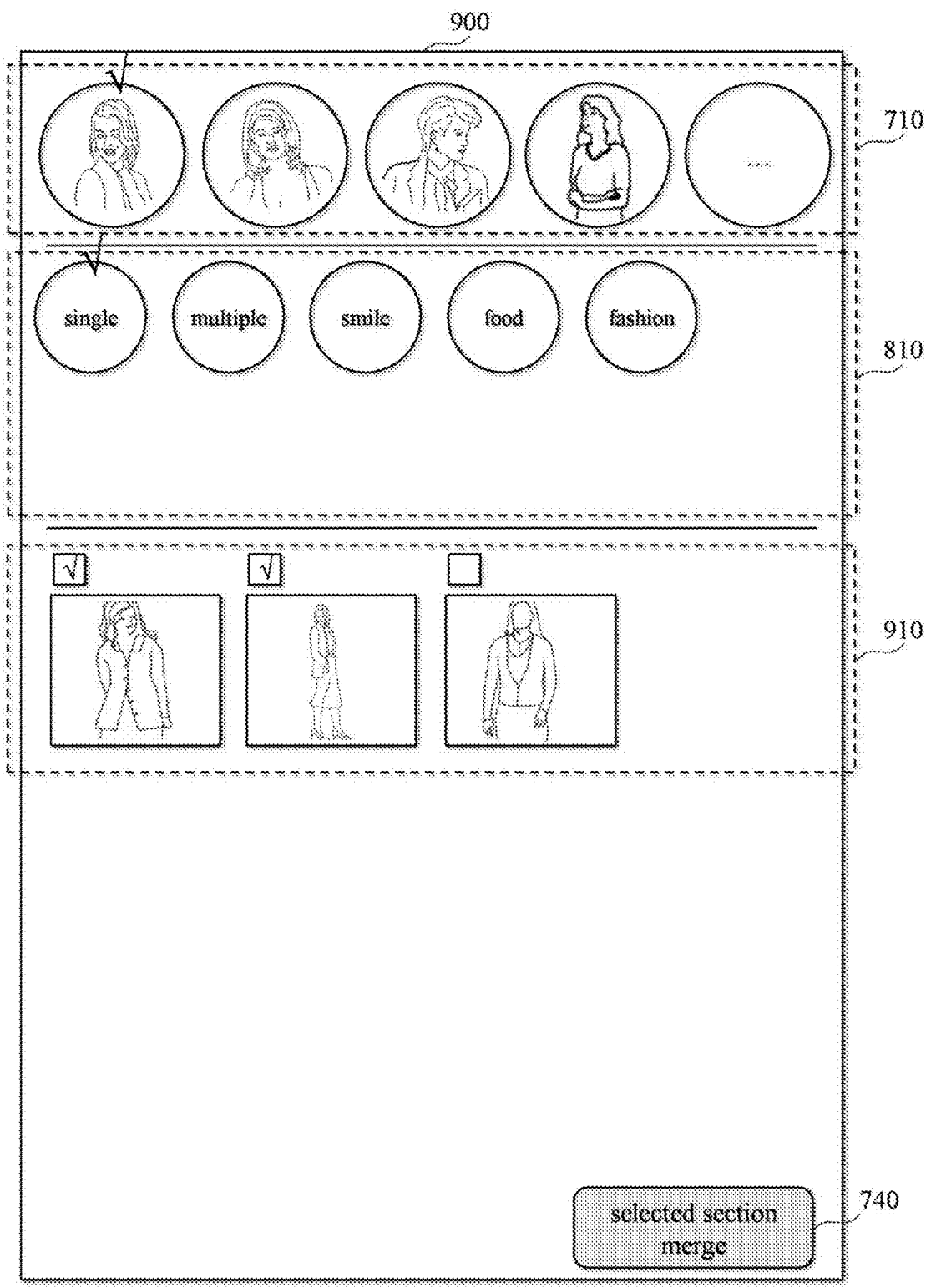

FIGS. 7 to 9 illustrate other examples of a video editing screen according to an example embodiment.

On a third screen 700 of FIG. 7, a fourth box 710 indicated with dotted lines represents an example of a plurality of main contexts that have been set through an AI model. Here, the fourth box 710 represents an example in which, in response to the main contexts being set as persons that appear in a video, representative images of the persons are displayed. Also, a fifth box 720 indicated with dotted lines represents an example of a plurality of sub-contexts. Here, the sub-contexts may be configured as common contents for each of the main contexts as a guide to help users to easily determine a desired context and, if necessary, may be configured as sub-contexts that appear in an input video to correspond to a main context. A sixth box 730 indicated with dotted lines represents an example of entire clips that have been extracted from the input video. Even in this case, if the user presses a merge button 740 for merging a section selected by selecting the desired clips from among the displayed entire clips, such as by checking the check boxes adjacent to the desired clips, the selected clips may be merged and a highlight image may be generated.

A fourth screen 800 of FIG. 8 represents an example in which, in response to a selection from the user on a main context, sub-contexts corresponding to the main context (sub-contexts into which clips extracted according to the main context are classified) are displayed as illustrated in a seventh box 810 indicated with dotted lines. Also, an eighth box 820 represents an example of clips extracted to correspond to the main context selected by the user. Even in this case, if the user presses the merge button 740 for merging a section selected by selecting desired clips from among the displayed clips, such as by checking check boxes, the selected clips may be merged and a highlight image may be generated.

A fifth screen 900 of FIG. 9 represents an example in which, in response to a selection from the user on a sub-context "single," clips that satisfy all of the selected main context and the selected sub-context are displayed as illustrated in a nineth box 910 indicated with dotted lines. Also, the nineth box 910 represents an example in which the user selects desired clips, such as by checking check boxes. Here, if the user presses the merge button 740, the selected first and second clips may be merged and a highlight image may be generated.

Although FIGS. 7 to 10 illustrate examples in which the main context is set as "person," the main context or sub-contexts may be differently preset or the user may directly set the main context and sub-contexts (make a selection from among given texts) depending on example embodiments. Here, a case in which the main context is set as the sub-context and the sub-context is set as the main context may be considered. For example, when "animal" is set as a main context, a plurality of main contexts may be generated for each type of "animal." Also, a sub-context "person" may refer to clips in which a person is included among clips extracted according to the main context.

Figure 10:
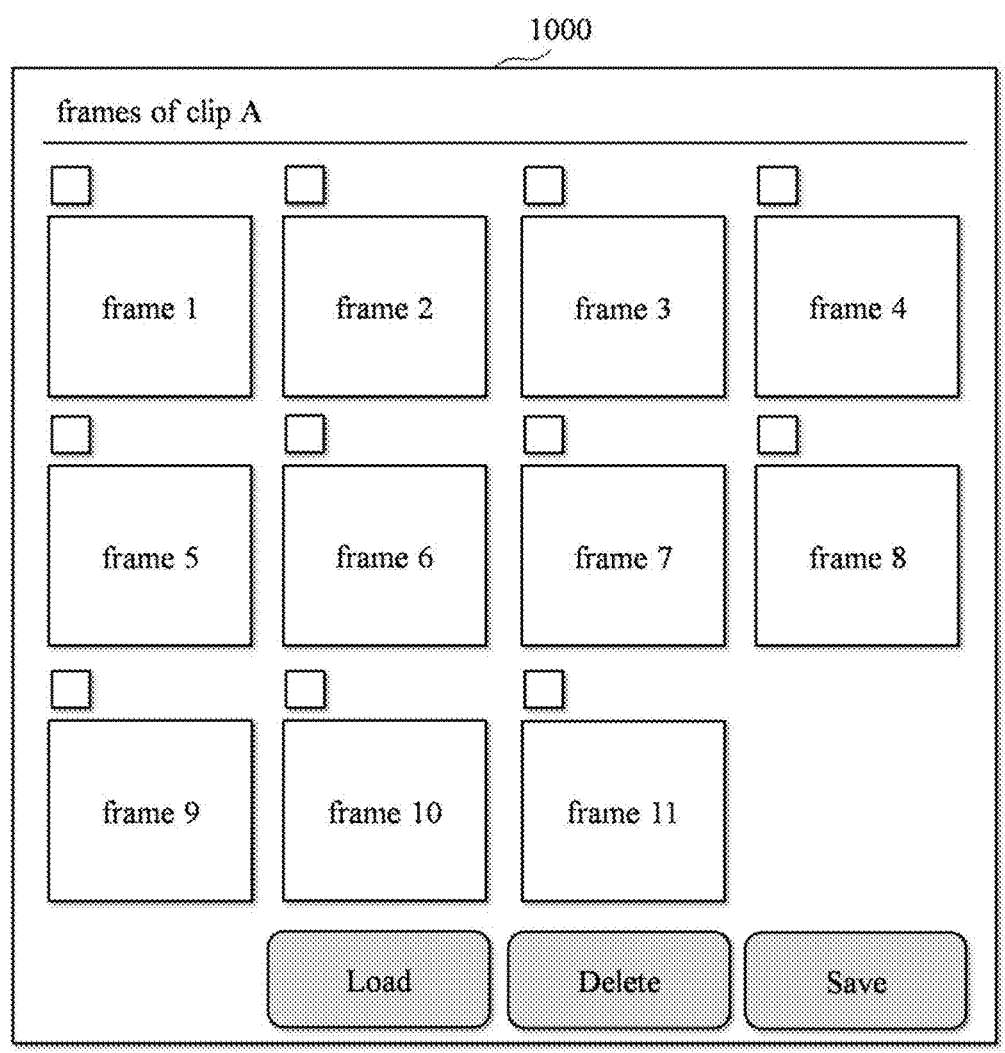
FIG. 10 illustrates an example of a clip editing screen according to an example embodiment.

FIG. 10 illustrates an example of a clip editing screen according to an example embodiment. Referring to FIGS. 4 to 9, when the user selects an area on which a specific clip is displayed, a clip editing screen 1000 of FIG. 10 may be provided for the user. Snapshots of frames included in the selected clip may be displayed on the clip editing screen 1000. Here, the user may delete individual frames, may change the order thereof, or may insert another frame therebetween. Change in order between frames may be processed using, for example, a drag-and-drop event. Also, editing of a selected clip may be completed by storing the selected clip to include the changed frames.

As described above, according to some example embodiments, it is possible to provide a guide for video editing to a user based on a context identified in a video and to enable video editing based on a user-specified context.

The systems or apparatuses described herein may be implemented using hardware components, software components, or a combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. The program instructions recorded in the media may be specially designed and configured for the example embodiments or may be known and available to those skilled in the computer software art. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Also, the media may be various types of recording devices or storage devices in a form in which one or a plurality of hardware components are combined. Without being limited to media directly connected to a computer system, the media may be distributed over the network. Examples of the program instructions include a machine code as produced by a compiler and a high-language code computer-executable using an interpreter.

MODE

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A video editing method of a computer apparatus comprising at least one processor, the video editing method comprising:
   analyzing an input video through an artificial intelligence model, setting a plurality of contexts for the video, and extracting, from the video, a plurality of clips corresponding to the set plurality of contexts, respectively;
   generating a user interface for selecting a specific context from among the plurality of contexts;
   providing a plurality of clips extracted from the video for a context selected from among the plurality of contexts through the generated user interface, through the user interface;
   providing an editing function of a frame unit for a clip selected from among the plurality of clips provided through the user interface, wherein the editing function comprises providing a plurality of individual frames from the selected clip through the user interface, whereby the user interface is configured and arranged to allow a user to delete one or more of the individual frames and to change the order of the individual frames and to insert an additional frame between two of the individual frames; and generating a highlight image of the selected context for the video by merging clips selected from among the plurality of clips provided through the user interface, and wherein:
each of the plurality of contexts has a hierarchical structure of a single main context and a plurality of sub-contexts for the single main context,
the extracting of the plurality of clips comprises classifying a plurality of clips extracted for the single main context into the plurality of sub-contexts,
the single main context comprises a person that appears in the input video, whereby each of the plurality of clips extracted from the video includes the person in each frame thereof; and
the plurality of sub-contexts comprises at least three of the following sub-contexts:
single, in which the person is shown alone;
multiple, in which the person is shown with others;
food, in which the person is shown with food;
animal, in which the person is shown with an animal; and
a particular season, in which the person is shown in the particular season.

2. The video editing method of claim 1, wherein the artificial intelligence model is trained to analyze the input video, to extract a context related to the video from among a preset plurality of contexts, and to extract consecutive frames corresponding to the extracted context as a single clip.

3. The video editing method of claim 1, wherein the generating of the user interface comprises generating a user interface that comprises a function for selecting a main context for a single context from among the plurality of contexts and a function for selecting a single sub-context from among the plurality of sub-contexts for the selected main context.

4. The video editing method of claim 1, further comprising:
providing a section editing function for a clip selected from among the plurality of clips provided through the user interface,
wherein the section editing function comprises a function for recognizing a multi-touch comprising a first touch and a second touch on a touchscreen in a touchscreen environment, making a distance between a position of the first touch on the touchscreen and a position of the second touch on the touchscreen correspond to a playback section of the selected clip, changing a playback start point of the selected clip in response to a change in the position of the first touch on the touchscreen, and changing a playback end point of the selected clip in response to a change in the position of the second touch on the touchscreen.

5. A computer-readable record medium storing a computer program to perform the method according to claim 1 in a computer apparatus.

6. A computer apparatus comprising:
at least one processor configured to execute a computer-readable instruction,
wherein the at least one processor is configured to:
analyze an input video through an artificial intelligence model, set a plurality of contexts for the video, and extract, from the video, a plurality of clips corresponding to the set plurality of contexts, respectively, generate a user interface for selecting a specific context from among the plurality of contexts, provide a plurality of clips extracted from the video for a context selected from among the plurality of contexts through the generated user interface, through the user interface, provide an editing function of a frame unit for a clip selected from among the plurality of clips provided through the user interface, wherein the editing function comprises providing a plurality of individual frames from the selected clip through the user interface, whereby the user interface is configured and arranged to allow a user to delete one or more of the individual frames and to change the order of the individual frames and to insert an additional frame between two of the individual frames; and generate a highlight image of the selected context for the video by merging clips selected from among the plurality of clips provided through the user interface, wherein:
each of the plurality of contexts has a hierarchical structure of a single main context and a plurality of sub-contexts for the single main context, and
the at least one processor is configured to classify a plurality of clips extracted for the single main context into the plurality of sub-contexts,
the single main context comprises a person that appears in the input video, whereby each of the plurality of clips extracted from the video includes the person in each frame thereof; and
the plurality of sub-contexts comprises at least three of the following sub-contexts:
single, in which the person is shown alone;
multiple, in which the person is shown with others;
food, in which the person is shown with food;
animal, in which the person is shown with an animal; and
a particular season, in which the person is shown in the particular season.

7. The computer apparatus of claim 6, wherein the artificial intelligence model is trained to analyze the input video, to extract a context related to the video from among a preset plurality of contexts, and to extract consecutive frames corresponding to the extracted context as a single clip.

8. The computer apparatus of claim 6, wherein the at least one processor is configured to generate a user interface that comprises a function for selecting a main context for a single context from among the plurality of contexts and a function for selecting a single sub-context from among the plurality of sub-contexts for the selected main context.

9. The computer apparatus of claim 6, wherein the at least one processor is configured to provide a section editing function for a clip selected from among the plurality of clips provided through the user interface, and
the section editing function comprises a function for recognizing a multi-touch comprising a first touch and a second touch on a touchscreen in a touchscreen environment, making a distance between a position of the first touch on the touchscreen and a position of the second touch on the touchscreen correspond to a playback section of the selected clip, changing a playback start point of the selected clip in response to a change in the position of the first touch on the touchscreen, and changing a playback end point of the selected clip in response to a change in the position of the second touch on the touchscreen.

\* \* \* \* \*